(12) United States Patent
Maalej et al.

(10) Patent No.: US 11,341,054 B2
(45) Date of Patent: May 24, 2022

(54) METHOD FOR DATA PROCESSING

(71) Applicant: VSORA, Meudon la Foret (FR)

(72) Inventors: Khaled Maalej, Paris (FR); Trung Dung Nguyen, Massy (FR); Julien Schmitt, Massy (FR); Pierre-Emmanuel Bernard, Antony (FR)

(73) Assignee: VSORA, Meudon la Foret (FR)

( * ) Notice: Subject to any disclaimer, the term of this patent is extended or adjusted under 35 U.S.C. 154(b) by 99 days.

(21) Appl. No.: 16/644,070

(22) PCT Filed: Sep. 3, 2018

(86) PCT No.: PCT/FR2018/052140
§ 371 (c)(1),
(2) Date: Mar. 3, 2020

(87) PCT Pub. No.: WO2019/043345
PCT Pub. Date: Mar. 7, 2019

(65) Prior Publication Data
US 2020/0409853 A1 Dec. 31, 2020

(30) Foreign Application Priority Data
Sep. 4, 2017 (FR) .................... 17 58134

(51) Int. Cl.
G06F 12/0871 (2016.01)
G06F 8/40 (2018.01)
G06F 8/75 (2018.01)
G06F 12/02 (2006.01)
G06F 12/084 (2016.01)

(52) U.S. Cl.
CPC ............ *G06F 12/0871* (2013.01); *G06F 8/40* (2013.01); *G06F 8/75* (2013.01); *G06F 12/0238* (2013.01); *G06F 12/084* (2013.01)

(58) Field of Classification Search
CPC .................................................. G06F 12/0871
USPC .......................................................... 711/154
See application file for complete search history.

(56) References Cited

U.S. PATENT DOCUMENTS

| | | | | |
|---|---|---|---|---|
| 6,381,738 | B1 * | 4/2002 | Choi | G06F 8/443 711/E12.006 |
| 7,376,768 | B1 * | 5/2008 | Macciocca | G06F 3/0613 710/24 |
| 2002/0174316 | A1 * | 11/2002 | Dale | G06F 9/544 711/170 |

(Continued)

FOREIGN PATENT DOCUMENTS

| | | |
|---|---|---|
| EP | 1 383 044 A1 | 1/2004 |
| EP | 1 498 841 A1 | 1/2005 |
| EP | 2 521 063 A1 | 11/2012 |

*Primary Examiner* — Jae U Yu
(74) *Attorney, Agent, or Firm* — Faegre Drinker Biddle & Reath LLP

(57) ABSTRACT

A method for data processing implemented by computer means and comprises: for a plurality of objects of the data processing, conducting an analysis of a computer code of the data processing defining a use of said objects in the data processing, on the basis of the analysis of the computer code (COD), allocating each object to one of a plurality of memory areas for the construction and then the destruction of each object in the corresponding memory area during the data processing, in such a way that, during the data processing, each memory area exhibits stack operation.

9 Claims, 3 Drawing Sheets

(56) References Cited

U.S. PATENT DOCUMENTS

2005/0040244 A1 2/2005 Kanan
2012/0284808 A1 11/2012 Teglia

* cited by examiner

METHOD FOR DATA PROCESSING

CROSS-REFERENCE TO RELATED APPLICATIONS

This application is the U.S. national phase of the International Patent Application No. PCT/FR2018/052140 filed Sep. 3, 2018, which claims the benefit of French Application No. 17 58134 filed Sep. 4, 2017, the entire content of which is incorporated herein by reference.

FIELD

The disclosure relates to the processing of digital data executed by computer means, and more particularly to the memory management required in this context.

BACKGROUND

In a known way, in information technology, the term "allocation" denotes the mechanism for reserving locations in a memory for the storage therein of variables or objects, which may be highly complex and of large size. The counterpart of allocation, deallocation, is the mechanism by which the allocated memory is released.

Among the principles currently used for governing the allocation of data processing objects to a memory, the principle of allocation to a stack, also known as stack allocation, may be mentioned. This principle is based on the use of a pointer which designates the first available memory address. The object that is allocated to the memory is then stored subsequently at this address, and the pointer is updated on the basis of this memory address and the size of the allocated object.

This allocation principle is particularly useful because it is simple to implement and therefore has high performance, but it requires the deallocation to be symmetrical with the allocation. In other words, among the objects present in the memory at a given instant, the last object created must be the first to be destroyed. This operation is known by the abbreviation LIFO, for "Last In First Out".

In very many applications, because the different objects of data processing have widely varying uses, they can only be adapted with difficulty and/or with lower performance to allocation and deallocation corresponding to stack operation of the memory. Consequently, the principle of memory management required for data processing usually has to be of increased complexity.

The present disclosure resolves this problem.

SUMMARY

For this purpose, the disclosure relates to a method for executing data processing, the method being implemented by computer means and comprising:

for a plurality of objects of the data processing, conducting an analysis of a computer code of the data processing defining a use of said objects in the data processing, on the basis of the analysis of the computer code, allocating each object to one of a plurality of memory areas for the construction and then the destruction of each object in the corresponding memory area during the data processing, in such a way that, during the data processing, each memory area exhibits stack operation.

According to an embodiment, at least two memory areas form separate areas of the same memory entity.

According to an embodiment, the two memory areas have respective starting locations defined by respective opposite ends of the memory entity.

According to an embodiment, each of the two memory areas is associated with a pointer configured to point toward a first free space of the memory area concerned, the pointer of each of the two memory areas being configured to move closer to the pointer of the other memory area for the construction of an object in the memory area concerned.

According to an embodiment, at least two areas belong to different memory entities.

According to an embodiment, conducting an analysis of the computer code includes, for each object of some or all of the objects, determining a start and an end of the use of the object in the data processing, the allocation of the object to the corresponding memory area being carried out on the basis of the start and end of the use of the object.

According to an embodiment, for at least one object, said object is allocated to the corresponding memory area on the basis of the value of a definition parameter of said object representative of one memory area from among the plurality of memory areas, said value being recorded in said code before the analysis of the computer code.

According to an embodiment, the method further comprises compiling the computer code for the production of one or more executable files that are executed during the data processing, the compilation comprising, for at least one object, inserting, into a transformed computer code generated on the basis of said computer code for the production of the executable file or files, a call to a destructor configured to destroy said object of the corresponding memory area immediately at the end of the use of said object.

According to an embodiment, for at least one object, the object is allocated to a memory area at an instant when the size of the object in the memory area is not known.

The disclosure also relates to a computer program comprising instructions for implementing the method as defined above, when these instructions are executed by a processor.

The disclosure also relates to a device configured to be used for the execution of data processing, the device comprising an analysis module configured for:

for a plurality of objects of the data processing, conducting an analysis of a computer code of the data processing defining a use of said objects in the data processing, on the basis of the analysis of the computer code, allocating each object to one of a plurality of memory areas of a memory module for the construction and then the destruction of each object in the corresponding memory area during the data processing, in such a way that, during the data processing, each memory area exhibits stack operation.

BRIEF DESCRIPTION OF THE DRAWINGS

The disclosed embodiments will be more fully understood from a perusal of the following detailed description, provided purely by way of example, with reference to the attached figures, in which.

DETAILED DESCRIPTION

Figure 1:
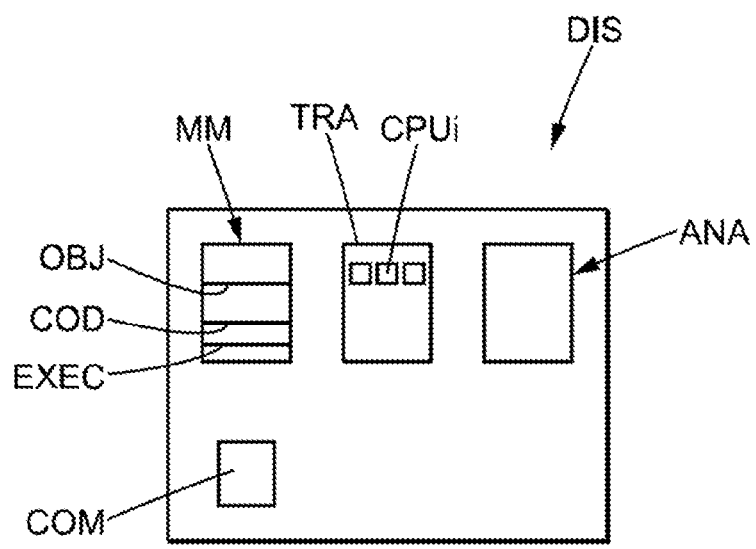
FIG. 1 shows a device according to an embodiment.

FIG. 1 shows a device DIS according to an embodiment.

The device DIS is configured to be used at least for the execution of data processing.

In the context of the disclosure, two configurations of the device DIS are provided.

In the context of the first configuration, the device DIS is adapted for the actual implementation of the data processing.

In the context of the second configuration, the device DIS is used in the preparation of the data processing, the actual implementation of which is conducted by a second device, separate from the device DIS.

This is described in detail below.

As a general rule, the device DIS is a computer device, the data concerned in the data processing being digital data.

The data of the data processing relate to content of any kind. For example, they represent information sent by a first piece of electronic equipment to a second piece of electronic equipment.

The data processing comprises the manipulation of objects OBJ forming part of the data of the data processing. It should be noted that these objects may be used at any stage of the data processing, and may exist during a longer or shorter portion of the data processing, or even throughout the duration of the data processing.

For example, the objects OBJ are of any type from among the types of objects commonly found in data processing.

For example, each object OBJ corresponds to one element from among the group comprising at least a number, a matrix, a list, or a chain of characters.

In the context of the first configuration of the device, the device DIS comprises a communication module COM, a memory module MM and a processing module TRA. It also comprises an analysis module ANA.

These elements are in communication with one another, for example by means of one or more buses to which they are connected.

The communication module COM is configured to allow communication between the device DIS and other pieces of equipment. For example, this module is configured for the reception by the device DIS of data used at the start of the data processing.

Advantageously, this module COM is also provided for supplying data resulting from this data processing to a device remote from the device DIS.

The communication module COM is adapted for communication using one or more known technologies.

Advantageously, the communication module COM is adapted for wireless communication. For example, it is adapted for wireless communication based on one or more standard technologies used in mobile telephony, such as 3G, 4G, 5G, etc., one or more near field communication technologies, and/or one or more technologies from among ZigBee, RFID, WiFi, and other technologies.

Alternatively or additionally, the communication module COM is adapted for wire communication, by contrast with wireless telecommunications. For example, it comprises one or more sockets for connecting the communication module to a remote piece of equipment by wire.

Any form of communication via a removable data medium such as a USB, for Universal Serial Bus, module is evidently possible.

The memory module MM is adapted for data storage in general.

In the context of an embodiment, the memory module MM is adapted, in particular, for storing data of the data processing, notably objects OBJ, at the different stages of the data processing.

The memory module MM is also adapted for storing programs required for the correct operation of the device DIS, both for the execution of the data processing and for the routine operation of the device DIS.

Notably, the memory module MM is adapted for storing a program PRG comprising instructions for the implementation of the method as described below when the instructions are executed by a processor such as the processing module TRA.

The memory module MM is also adapted for storing a computer code COD which defines the data processing.

The computer code COD represents a definition of one or more sequences of operations of the data processing, in the context of which the objects OBJ of the processing are manipulated.

For example, for each object OBJ of the processing, the computer code COD comprises a definition of the object OBJ concerned, together with the use of this object. This use has a start and an end.

It should be noted that this definition and/or this use is not necessarily explicit in the computer code COD. In other words, the definition and the use may originate from the computer code without being present there in an explicit form.

It should be noted, however, that this definition is typically made explicit in one or more executable files EXEC which are described below and which are generated on the basis of the computer code.

For example, the start of the use is defined by the first occurrence of the object OBJ in the code COD. The end of the use is, for example, defined by the last occurrence of the object in question in the code COD.

The use in question includes at least one operation during which the object is manipulated, such as an operation of creating the object. Advantageously, the use comprises the generation of a new object on the basis of the object in question.

The code COD is written in one or more computer languages. For example, this language is a known language, such as C++ language.

In practice, the computer code COD defines, wholly or partially, the operations of the data processing that is carried out. Thus, for example, it defines the input data of the processing, as well as the set of operations to which these data are subjected during the processing.

Conventionally, the computer code COD is intended to be transformed into one or more executable files EXEC, whose execution, by one or more processors such as those of the processing module TRA, is manifested by the implementation of the data processing. This transformation operation is known by the name of compilation.

This transformation is manifested by the existence of the code in one or more forms constituting intermediate states of the code between its initial form, as computer code COD, and the executable files EXEC in question. As described below, one of these forms includes, for example, in addition to the code in a version which may or may not be transformed, instructions added to the code COD, such as instructions added by the analysis module ANA.

The memory module MM comprises at least one memory entity EMi, where i indexes the memory entity or entities.

Each memory entity EMi forms a continuous memory space for storing data of the processing, particularly objects OBJ. In other words, within each memory entity, the logical addresses of the different blocks forming the memory space follow one another.

The memory space in question is a logical memory space. It should be noted that a memory space may correspond to a plurality of physical memory spaces.

In a known way, this memory space comprises blocks adapted to contain data, to return these data, and to destroy these data, thereby making the previously occupied blocks available again for new data.

The physical principle underlying these functions is, for example, a known one.

As a general rule, the memory entities are, for example, formed in a known way and are of any type. Advantageously, however, the memory entities are entities of the random access memory type, such as DRAM (for Dynamic Random Access Memory).

Figure 2:
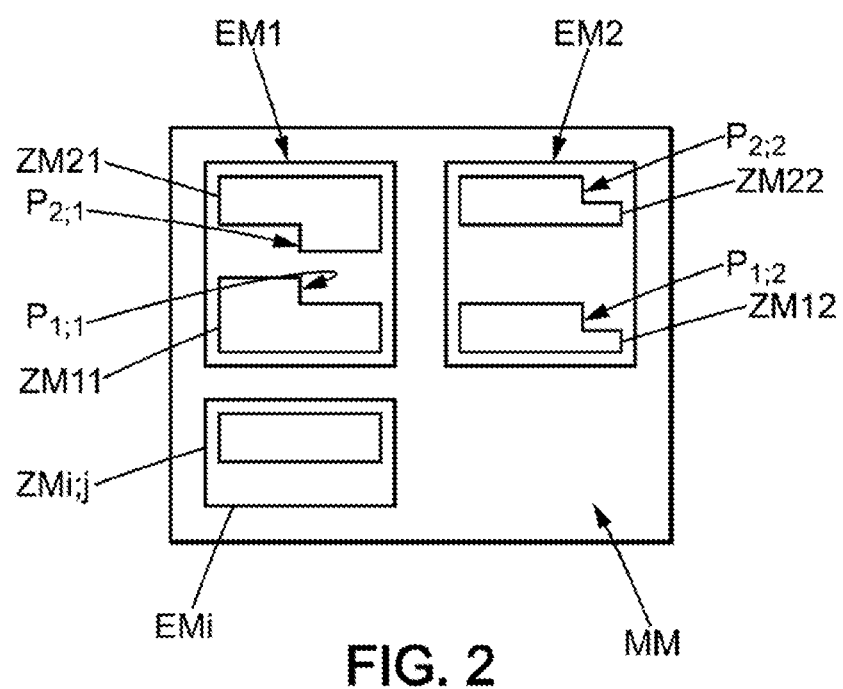
FIG. 2 shows a memory module of the device of FIG. 1.

Although it is shown in FIGS. 1 and 2 in the form of a spatially localized block, the memory module MM is of any form in terms of the number of memory entities that it comprises and the distribution of these memory entities between the different elements of the device DIS shown.

For example, some or all of these memory entities are contained in the processing module TRA.

The processing module TRA is configured for controlling the other elements of the device DIS for the operation of the device DIS.

The processing module TRA comprises one or more processors CPUi, notably adapted for executing instructions, notably for performing operations on the data of the data processing for the implementation of this processing.

Advantageously, the module TRA comprises a plurality of such processors. The processors CPUi are, for example, adapted for operating according to an operating mode in the context of which one of the processors operates as a master processor, and the others operate as slave processors, as is known to those skilled in the art.

With reference to FIG. 2, the analysis module ANA is configured for analyzing the computer code COD contained in the memory module MM, in order to transform it into the executable file or files EXEC.

More specifically, the module ANA is configured for at least analyzing the computer code COD and generating, on the basis of this code, the executable file or files to be executed for the implementation of the actual data processing. In other words, the analysis module ANA is configured as a compiler. For example, it is a compiler of a known type. Advantageously, the compiler is user-configurable.

In the context of the disclosure, the analysis module ANA is configured for allocating, on the basis of the analysis of the computer code COD, at least some of the objects OBJ of the data processing to one of a plurality of memory areas ZMi,j belonging, respectively, to the memory entity EMj.

In other words, the analysis module ANA is configured for specifying that, during the execution of the files resulting from the compilation, the construction—and therefore the destruction—of each object OBJ by the module ANA will take place in such or such a memory area ZMi,j, which is located in the memory entity EMj.

Additionally, in the context of the disclosure, the analysis module ANA is configured for allocating the objects OBJ in question to the memory areas ZMi,j in such a way that each memory area ZMi,j exhibits stack operation during the data processing.

In other words, during the actual data processing, because of the allocation carried out by the module ANA, each ZMi,j exhibits operation of the LIFO (for last in, first out) type.

Advantageously, this is the case for all the objects OBJ of the data processing.

It should be noted that, in some embodiments, for at least one object OBJ, its allocation to one of the memory areas is carried out at an instant when the size of the object OBJ in this memory area is not known.

The details of the allocation of the objects OBJ by the analysis module ANA are described in the context of the description of the method according to the embodiment below.

There are at least two of these memory areas ZMi,j. Their exact number is, for example, determined in advance.

Stack operation is known in itself. In the context of this operation, each memory area ZMi,j is associated with a pointer Pi,j which represents the first free memory block in the corresponding area, the preceding blocks, that is to say those located between the starting memory block of the memory area and this block designated by the pointer, being occupied by data.

If an object is constructed in the memory area ZMi,j, it is constructed in the memory block designated by the pointer and the subsequent memory blocks, according to the size of the object, the pointer being updated to designate the new first free memory block.

If the last object created in the memory area is destroyed, the corresponding memory blocks are released and the pointer is updated to designate the first free memory block free of the memory area after this destruction.

Thus, the management of a stack memory is particularly simple, since it is essentially based on the management of the associated pointer.

As is apparent from the above, the term "allocation" in this case is taken to mean the association made between an object OBJ and a memory area ZMi,j, resulting in the fact that, during the data processing, the object OBJ is constructed in this memory area. In the context of the disclosure, this allocation is made by the analysis module ANA upstream of the actual data processing.

Advantageously, in the context of the disclosure, at least two memory areas ZMi,j form part of the same memory entity EMi. In other words, they correspond to different regions of the same memory space.

Advantageously, also, these memory areas ZMi,j have respective starting locations corresponding to ends of this memory entity EMi which are opposed. In other words, given that the memory entity EMi has a first memory block and a last memory block in the sense of a chosen direction of travel, these first and last blocks form respective starting points of the two memory areas in question.

When an object is constructed in one of these memory areas, the updating of the associated pointer is manifested by the movement of this pointer toward the pointer of the other memory area.

In other words, if filling occurs, the pointers of these memory areas move in opposite respective directions, so that they approach one another if an object is created in one of the memory areas.

For example, the memory areas having the references ZM11 and ZM21 in FIG. 2 are configured in this way.

This configuration is particularly advantageous in terms of the size of memory space required.

However, this configuration is optional. For example, the memory areas ZMi,j of the same entity EMj have pointers Pi,j, which move in the same direction if an object is constructed in the associated memory area.

In this configuration, the starting point of one of the memory areas does not form an end memory block, as shown by the memory area ZM22 in FIG. 2.

It should be noted that the analysis module ANA is advantageously software.

Alternatively or additionally, the analysis module ANA is hardware.

Figure 3:
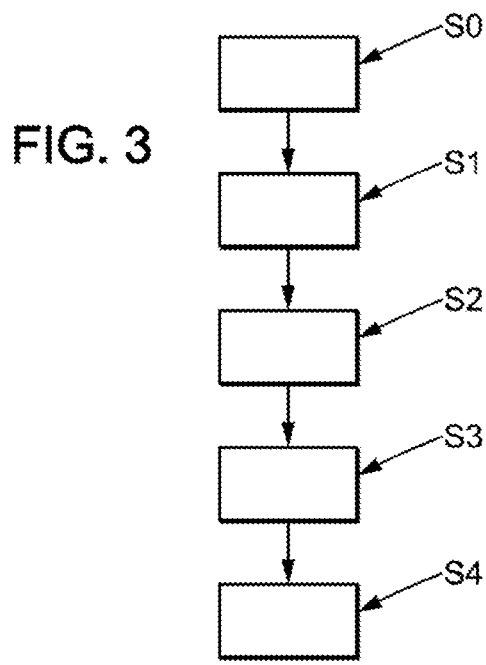
FIG. 3 is a block diagram showing a method according to an embodiment.

The method according to an embodiment for executing data processing will now be described in detail with reference to the figures, notably FIG. 3.

In an initial step S0, the computer code COD, which defines the data processing to be performed, is made available. As indicated above, this definition may be partly implicit, notably for the objects OBJ.

This computer code COD is, for example, produced by a generation process requiring one or more persons who have written some or all of the computer code, and/or one or more pieces of electronic equipment, typically used for inputting the code in question and/or for generating part of the code.

In a step S1, the analysis module ANA analyzes the computer code COD in order to allocate at least some of the objects OBJ of the data processing reflected in the computer code COD to one of the memory areas $ZMi,j$, in such a way that these areas operate in stack fashion during the execution of the data processing.

Advantageously, each object OBJ of the data processing is thus allocated to one of the memory areas $ZMi,j$.

In a given embodiment, in order to make this allocation, for each object OBJ, the analysis module ANA determines the start and the end of use of the object OBJ concerned in the context of the data processing.

For example, for two objects A and B, their use in the data processing is defined by the illustrative code shown below:

```
void func( )
{
OBJ A ;               //creation of A
OBJ B ;               //creation of B
<portion of code using A, B>
<portion of code using B>
}
```

Figure 4:
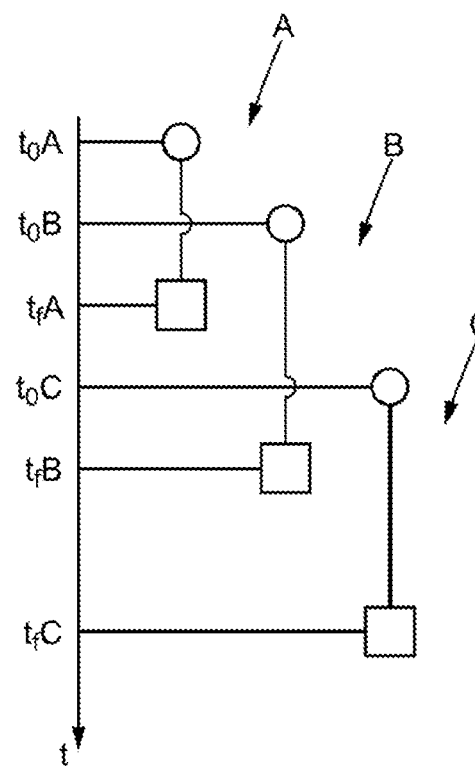
FIG. 4 shows the starts and ends of the use of a plurality of objects according to an embodiment.

The starts and ends of use of the objects, denoted for example by their respective instants of occurrence $t_0A$, $t_fA$, $t_0B$, $t_fB$, $t_0C$ and $t_fC$ for three objects A, B, C shown in FIG. 4, are used for associating a memory area $ZMi,j$ with each object.

For example, in one configuration, this association is produced by sorting the objects into groups of objects in which the uses of the objects do not overlap, as shown in FIG. 4.

In other words, within each group of objects, for any pair of objects A, B, where A is the one whose use ends first, the relation $t_fA<t_0B$ is true, where $t_fA$ denotes the end of the use of the object A and $t_0B$ denotes the start of the use of the object B.

For example, in FIG. 4, objects A and C may be grouped in a given group and allocated to the same memory area, but object B cannot be grouped with objects A and C, and therefore cannot be allocated to the memory area of object A or of object C.

It should be noted that this operation does not require the expression of the starts and ends of use in the form of explicit dates, but simply the determination of their relative order of occurrence, which is a result of the analysis of the code COD by the analysis module ANA.

Each group of objects formed, and therefore each object in the group, is then associated with a given memory area $ZMi,j$.

It should be noted that the sorting process is advantageously configurable, for example in the definition of the sorting modalities.

Thus, for example, when a plurality of objects are adapted to be placed in the same group, but cannot be present there simultaneously, the modalities for choosing the object to be accepted are adapted according to one or more predefined criteria.

For example, in a given configuration, the object whose creation is earliest in time is chosen.

In an alternative embodiment, the allocation is conducted on the basis of information included in the computer code and recorded therein before the analysis by the analysis module ANA.

Advantageously, for a given object OBJ, this information comprises the value of a definition parameter of said object representative of one memory area $ZMi,j$ from among the plurality of possible memory areas, said value having been recorded in said code before the analysis of the computer code COD by the analysis module ANA.

In other words, in this configuration, at the moment of its analysis, the code COD already contains the declaration of the allocation of some or all of the objects OBJ to one of the memory areas $ZMi,j$.

It should be noted that the two approaches are compatible. Thus, for example, for some of the objects, the allocation is prerecorded in the code, and for the rest of the objects the allocation is determined by analysis of the starts and ends of use of the objects as described above.

When the allocation has been determined, the analysis module ANA reports the result of the allocation in the code COD, or alternatively in a transformed code resulting from a step of transformation of the code into the executable file or files EXEC. For this reporting, the analysis module inserts corresponding information into the code or the transformed code, this information being representative of the memory area $ZMi,j$ to which the object OBJ is allocated.

For example, the added information take the form of the value of one or more parameters or attributes of the definition of the object in the code or in the transformed code which characterize the associated memory area $ZMi,j$, this value or these values then being retained during the different steps of transformation of the code so that it or they are present in the executable file or files.

Advantageously, in a step S2, for at least one object OBJ, the analysis module ANA carries out the insertion, into the computer code COD or the transformed code, of a call to a destructor configured for causing the destruction of said object of the memory area $ZMi,j$ immediately corresponding to the end of the use of said object.

Advantageously, the placing of this insertion is independent of the range of one or more functions in the context of which said object is manipulated. This range corresponds to the use of the function.

In other words, in this step, the analysis module ANA configures the occurrence of the destruction of the object concerned in the associated memory area $ZMi,j$ to cause this destruction to take place after the end of the use of the object, and not at the end of the range of the function in the context of which the use of the object takes place, as is usually the case.

For example, with reference to the illustrative code above, the insertion of these destructors for the objects A and B is performed as follows.

```
void func( )
{
OBJ A ;                    //creation of A
OBJ B ;                    //creation of B
<portion of code using A, B>
Destructor (A) ;
<portion of code using B>
Destructor (B) ;
}
```

It should be noted that this step is optional.

Alternatively, the analysis module ANA causes the destructors to operate at the end of the range of the function manipulating the object, which includes the end of the use of the object.

In a step S3, the analysis module ANA completes the compilation of the code COD, which is manifested by the generation of the executable file or files EXEC by the processing module TRA for the execution of the actual data processing.

This step may include one or more operations known to those skilled in the art.

In a step S4, which may be seen as the continuation of the above method, the data processing is implemented by means of the execution of the EXEC file or files resulting from the preceding step by the processing module TRA.

In this processing, the objects OBJ are successively created and destroyed in the memory areas to which they have been allocated in the preceding steps, in such a way that these memory areas ZMi,j operate in stack fashion until the completion of the actual data processing.

The above description has been provided for the first configuration, that is to say the configuration in which the device DIS carries out both the task of compiling the computer code COD and the task of executing the EXEC files for the implementation of the actual data processing.

Figure 5:
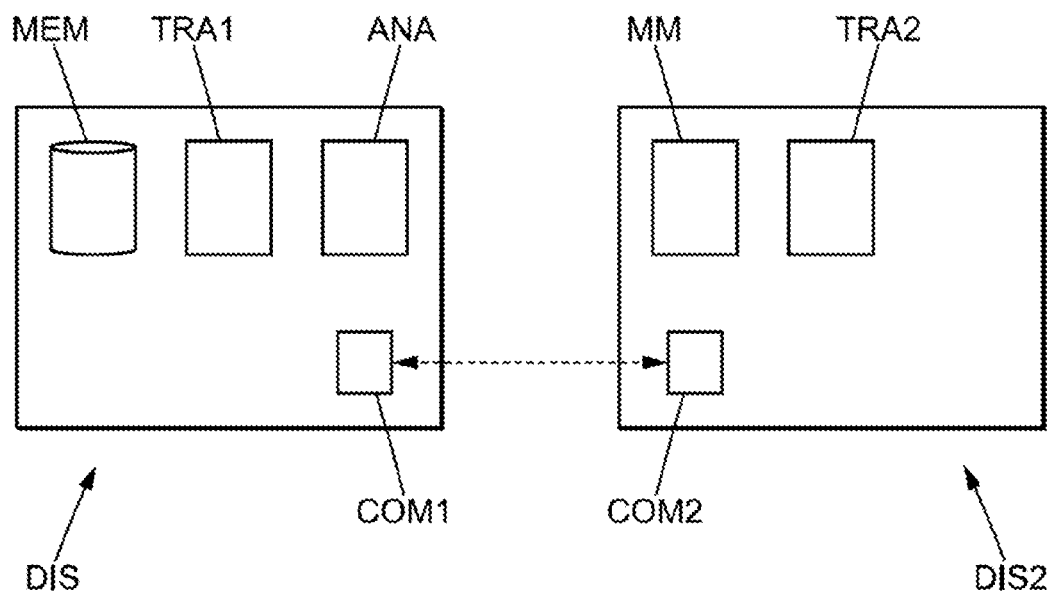
FIG. 5 shows an alternative configuration according to an embodiment.

In the second configuration, with reference to FIG. 5, the data processing which results from the execution of the EXEC files supplied at the end of the compilation, is carried out by a second device DIS2, comprising the memory module MM as described above, the device DIS being configured to perform the allocation of the objects OBJ to the memory areas ZMi,j of the memory module MM of the second device DIS2.

In this configuration, the device DIS is adapted for communicating with other pieces of equipment, notably the second device DIS2.

For this purpose, it comprises a communication module COM1. This communication module COM1 is, for example, similar to the module COM described above.

The device DIS also comprises the analysis module ANA described above, which is provided for analyzing the computer code COD and, on the basis of this analysis, allocating the objects OBJ to one of the memory areas ZMi,j which, in this configuration, form part of the memory module MM located in the second device, always in such a way that these memory areas ZMi,j conform to stack operation during the actual data processing.

Additionally, the device DIS comprises a memory MEM configured for storing the computer code COD, and for storing the EXEC files resulting from the compilation of the code COD by the analysis module ANA and the various intermediate files between the code COD and these EXEC files. The memory MEM is also provided for storing the program PRG.

In this second configuration, the memory MEM is not intended to contain the objects OBJ, which are manipulated by the second device DIS2 which implements the actual data processing.

This memory MEM can have any configuration. In particular, it may take the form of a single physical and/or logical memory entity. In some embodiments, the memory MEM may have a configuration similar to that of the memory module MM (typically identical in terms of structure).

The device DIS also comprises a processing module, denoted TRA1, adapted for executing instructions. This module TRA1 comprises one or more processors. In practice, this processing module TRA1 is provided for executing programs located in the memory MEM for the correct operation of the device DIS.

For its part, the second device DIS2 is adapted for communicating with other pieces of equipment, notably with the device DIS, for receiving the EXEC files that it is intended to execute in order to implement the actual data processing.

It is, for example, provided so as to additionally supply data resulting from the data processing to a remote piece of equipment.

For this purpose, it comprises a communication module COM2 which corresponds, for example, to the communication module COM described above.

As indicated above, it also comprises the memory module MM described above, comprising the memory areas ZMi,j to which the objects OBJ of the data processing are allocated by the analysis module ANA on the basis of the analysis of the computer code.

It also comprises a processing module TRA2. This module advantageously corresponds to the processing module TRA described above.

In the context of the second configuration, the progress of the method is similar to that described above, with the difference that the generation of the EXEC files on the basis of the code COD is implemented via the device DIS, and that the execution of these EXEC files for the implementation of the actual data processing is implemented via the second device DIS2 to which the EXEC files have been supplied.

In other words, the analysis module ANA of the device DIS analyzes the code COD which is located in the memory MEM of the device DIS, allocates the objects OBJ reported by the code to the different memory areas ZMi,j of the memory module MM of the second device DIS2 so that they operate in stack fashion during the data processing, and generates the EXEC file or files.

These files are then transferred to the second device which implements the data processing on the basis of these files.

During this processing, the objects OBJ are generated in the memory area ZMi,j allocated by the analysis module in such a way that the memory areas ZMi,j operate in stack fashion.

Thus, because of these two possible configurations, the memory module MM is either an element of the device DIS or an element of a device other than the device DIS. In the first configuration, the module MM forms part of the device DIS. In the second configuration, it forms part of a device DIS2, separate from the device DIS.

The disclosed embodiments have a number of advantages.

In the first place, it makes it possible to have a memory which, overall, operates in a greatly simplified way, because it comprises only memory areas operating in stack fashion.

Additionally, the embodiments are particularly easy to adapt to a variety of environments and configurations.

Notably, the embodiments are adapted to a wide variety of processing modules TRA, to data whose complexity is highly variable, and to very different memory module configurations.

Finally, it is easy to apply to pre-existing devices, since it does not require the replacement of the components of a computer device, or the making of major modifications to them.

The invention claimed is:

1. A method for executing data processing, the method being implemented by computer means and comprising:
for a plurality of objects of the data processing, conducting an analysis of a computer code of the data processing defining a use of the objects in the data processing,
on the basis of the analysis of the computer code, dynamically allocating each object to one of a plurality of memory areas for the construction and then the destruction of each object in the corresponding memory area during the data processing, in such a way that each memory area exhibits stack operation during the data processing,
wherein at least two memory areas of the plurality of memory areas form respective separate areas of the same memory entity,
wherein a first memory area of the two memory areas is associated with a first pointer and a second memory area of the two memory areas is associated with a second pointer, the first pointer being configured to point to a first free space of the first memory area, the second pointer being configured to point to a free space of the second memory area, each one of the first pointer and the second pointer being configured to move closer toward each other if an object is constructed in the first memory area or the second memory area.

2. The method as claimed in claim 1, wherein the two memory areas have respective starting locations defined by respective opposite ends of the memory entity.

3. The method as claimed in claim 1, wherein at least two memory areas of the plurality of memory areas belong to different memory entities.

4. The method as claimed in claim 1, wherein conducting an analysis of the computer code includes, for each object of some or all of the objects, determining a start and an end of the use of the object in the data processing, an allocation of the object to the corresponding memory area being carried out on the basis of the start and end of the use of the object.

5. The method as claimed in claim 1, wherein, for at least one object, the object is allocated to the corresponding memory area on the basis of the value of a definition parameter of the object representative of one memory area from among the plurality of memory areas, the value being recorded in the code before the analysis of the computer code.

6. The method as claimed in claim 1, further comprising compiling the computer code for the production of one or more executable files that are executed during the data processing, the compilation comprising, for at least one object, inserting, into a transformed computer code generated on the basis of the computer code for the production of the executable file or files, a call to a destructor configured to destroy the object of the corresponding memory area immediately at the end of the use of the object.

7. The method as claimed in claim 1, wherein, for at least one object, the object is allocated to a memory area at an instant when the size of the object in the memory area is not known.

8. A non-transitory computer program product comprising instructions for implementing the method as claimed in claim 1, when these instructions are executed by a processor.

9. A device configured to be used for the execution of data processing, the device comprising an analysis module configured for:
for a plurality of objects of the data processing, conducting an analysis of a computer code of the data processing defining a use of the objects in the data processing,
on the basis of the analysis of the computer code, dynamically allocating each object to one of a plurality of memory areas of a memory module for the construction and then the destruction of each object in the corresponding memory area during the data processing, in such a way that each memory area exhibits stack operation,
wherein at least two memory areas of the plurality of memory areas form respective separate areas of the same memory entity,
wherein a first memory area of the two memory areas is associated with a first pointer and a second memory area of the two memory areas is associated with a second pointer, the first pointer being configured to point to a first free space of the first memory area, the second pointer being configured to point to a free space of the second memory area, each one of the first pointer and the second pointer being configured to move closer toward each other if an object is constructed in the first memory area or the second memory area.

* * * * *